Patented Mar. 1, 1938

2,109,943

UNITED STATES PATENT OFFICE 2,109,943

ESTERS OF UNSATURATED ALIPHATIC MONOCARBOXYLIC ACIDS

George D. Graves, Wilmington, Del., and Raymond E. Thomas, Newburgh, N. Y., assignors to E. I. du Pont de Nemours & Company, Wilmington, Del., a corporation of Delaware No Drawing. Application November 24, 1934, Serial No. 754,612

10 Claims. (Cl. 260—106)

This invention relates to esters, and more particularly to the esters of polyunsaturated aliphatic monocarboxylic acids with monohydric alcohols of 12 to 14 carbon atoms.

This invention has as an object the provision of processes for the preparation of polyunsaturated aliphatic monocarboxylic acid esters of certain alcohols hitherto unobtainable in feasible quantities but now obtainable by the carboxylic reduction of the acids or acyl radicals of essentially saturated fatty oils, such as coconut oil. A further object is the class of esters thus prepared. Other objects will appear hereinafter.

These objects are accomplished by the following invention wherein an alcohol such as dodecyl and tetradecyl alcohol having 12 to 14 carbon atoms is reacted with an appropriate polyunsaturated monocarboxylic acid to form the ester which may also be formed by analogous processes.

The esters of the present invention may be made by various methods, such as the following:

A. By heating an alcohol with a polyunsaturated monocarboxylic acid, for example, tetradecyl alcohol with linseed oil acids.

B. By heating an alcohol with a polyunsaturated monocarboxylic acid anhydride, for example, dodecyl alcohol with an anhydride.

C. By heating a long-chain alcohol with an ester of a low molecular weight alcohol with a monocarboxylic polyunsaturated acid, for example, tetradecyl alcohol with a suitable polyunsaturated acid ester, preferably with 0.1 to 1.0% of a catalyst such as litharge.

D. By heating sodium salts of polyunsaturated monocarboxylic acids with long-chain halides, for example, the sodium salts of China-wood oil acids with dodecyl bromide.

E. By treating an alcohol with a polyunsaturated monocarboxylic acid chloride, for example, dodecyl alcohol with a suitable polyunsaturated acid chloride.

Having outlined above the general principles and purposes of the invention, the following examples thereof are added for purposes of illustration but not in limitation:

*Example 1.—Dodecyl linoleate*

One hundred sixty-six parts by weight of linseed oil acids and 93 parts by weight of dodecyl alcohol contaminated with 23 parts by weight of hydrocarbon were heated at 150° C. overnight. The temperature was then raised to 190°–200° C. for 4 hours, the product was filtered and distilled under 20 mm. vacuum to remove volatile material. The oily product had an ester number of 118.8 and an iodine number of 121.

*Example 2.—Dodecyl linoleate*

Three hundred thirty-one parts by weight of linseed oil acids and 186 parts by weight of dodecyl alcohol were heated at 200°–250° C. for 3 hours in a stream of carbon dioxide. The product was heated under vacuum to remove volatile material and was found to have an ester number of 128.1.

*Example 3.—Coconut alcohol esters of eleostearic acid*

Coconut oil was subjected to carboxylic hydrogenation and the resulting product was washed with water to remove water soluble materials. After drying in a suitable manner, such as with sodium sulfate, the resulting mixture of alcohols had a molecular weight of about 200. Fractionation of this mixture of alcohols indicated that it had the following composition: Hexyl alcohol 4 parts, octyl alcohol 81 parts, decyl alcohol 60 parts, dodecyl alcohol 390 parts, tetradecyl alcohol 160 parts, hexadecyl alcohol 115 parts, octadecyl alcohol 55 parts, eicosyl alcohol 15 parts. Two hundred parts by weight of the mixture of alcohols, 292 parts by weight of methyl beta eleostearate, 400 parts by weight of toluene, and 10 parts by weight of litharge were heated under a 4' reflux column, the toluene-methanol binary being separated, until the temperature of the distilling liquid was constant at 105°–110° C. The product was filtered and washed with salt water and the toluene removed by distillation. The residue was a yellow-colored viscous oil composed of the various alcohol esters of beta eleostearic acid in which the dodecyl ester predominated.

Alcohols which may be employed in the production of the esters embrace the alcohols obtained by carboxylic hydrogenation of vegetable oils, such as coconut oil and palm kernel oil. Mixtures of the esters obtained, for example, by esterifying a mixture of octyl, decyl, dodecyl, and tetradecyl alcohols with linoleic acid are also included in the scope of the invention.

The alcohols included within the scope of the present invention are the monohydric saturated primary aliphatic alcohols of 12 to 14 carbon atoms including dodecyl alcohol, tetradecyl alcohol, and tridecanol-1. A particularly important source of dodecyl and tetradecyl alcohol is the mixture of alcohols obtained by the carboxylic reduction of coconut oil. The monohydric alcohols obtainable in this way are a mixture, as shown in Example 3, but this mixture consists largely of dodecyl alcohol (43%), and tetradecyl alcohol (18%); these alcohols thus constituting the majority of the product. For descriptive purposes these alcohols may therefore be termed alcohols occurring to the extent of at least 15% in the mixture of alcohols obtainable by the carboxylic reduction of an essentially saturated fatty oil, or the acids, simple alkylesters, etc., thereof, i. e., by the carboxylic reduction of the acyl radicals of an essentially saturated fatty oil such as coconut or palm kernel oils.

Mixtures of esters obtained, e. g., from the mixture of alcohols including octyl, decyl, dodecyl, tetradecyl, etc., alcohols obtainable by the carboxylic reduction of coconut oil by esterifying this mixture of alcohols with linoleic acid or by similar esterification of a suitable fraction of said mixture, are also included within the scope of the invention. A particularly useful intermediate fraction containing 3 parts decyl alcohol, 39 parts dodecyl alcohol, 16 parts tetradecyl alcohol, 10 parts hexadecyl alcohol, and 3 parts octadecyl alcohol may be esterified and the mixture of esters thus obtained is found to be particularly useful in plasticizing cellulose nitrate compositions. The mixture of esters is more readily retained by plastic compositions and does not have a tendency to exude. The same applies to the unfractionated alcoholic mixture.

The esters of this invention may be used in conjunction with natural resins such as dammar or with synthetic resins such as polyvinyl chloride or with cellulose derivatives, such as cellulose nitrate, ethyl cellulose, or cellulose acetate in the preparation of lacquers and enamels for coating metal, wood, fabrics, paper and wire screens, dopes for coating fabrics, moisture-proofing lacquers for coating regenerated cellulose, etc., and in plastic compositions used in the manufacture of toilet ware, sheeting, rods, tubes, safety glass interlayers, dentures, etc. They may also be used in treating leather.

The alkyl esters derived from polyunsaturated aliphatic monocarboxylic acids and dodecyl and tetradecyl alcohols are more suitable for use as plasticizers, for example, with cellulose derivatives, than esters of unsaturated aliphatic carboxylic acid with polyhydric alcohols such as glycerol, inasmuch as the esters such as glycerol mono-oleate have a tendency to be more water soluble. On the other hand, the esters of this invention are less volatile than esters of the type represented by butyl oleate, have less odor, and are therefore more suitable for use as plasticizers in coating compositions. While esters of unsaturated aliphatic carboxylic acids with extremely high molecular weight alcohols such as hexadecyl alcohol or octadecyl alcohol, have a low volatility, the higher carbon content of these esters has a tendency to reduce the compatibility with cellulose derivative compositions and in this respect they are inferior to the esters derived from dodecyl and tetradecyl alcohols. For certain purposes, particularly where low freezing-point is desired, mixtures of esters in which esters derived from dodecyl or tetradecyl alcohols predominate are to be preferred to pure compounds. For use in coating compositions esters of higher molecular weight such as dodecyl linoleate are preferred to dodecyl acrylate. Further, esters derived from drying oil acids such as dodecyl oleostearate are preferred to dodecyl oleate, or dodecyl ricinoleate.

The above description and examples are intended to be illustrative only. Any modification of or variation therefrom which conforms to the spirit of the invention is intended to be included within the scope of the claims.

We claim:

1. An ester of a polyunsaturated aliphatic monocarboxylic acid with a saturated monohydric straight chain primary alcohol of 12 to 14 carbon atoms inclusive, said monocarboxylic acid being obtainable by the hydrolysis of a drying oil.

2. A mixture of esters of a polyunsaturated aliphatic monocarboxylic acid with the mixture of saturated monohydric primary alcohols obtainable by the carboxylic reduction of the acyl radicals of an essentially saturated fatty oil, said monocarboxylic acid being obtainable by the hydrolysis of a drying oil.

3. An ester composition wherein the hydrogen of the carboxyl group of a polyunsaturated aliphatic monocarboxylic acid, obtainable by the hydrolysis of a drying oil, is replaced by the radicals of the mixture of saturated monohydric primary alcohols obtainable by the carboxylic reduction of the acyl radicals of coconut oil, said mixture of alcohols being composed principally of dodecyl alcohol.

4. A dodecyl ester of a polyunsaturated aliphatic monocarboxylic acid obtainable by the hydrolysis of a drying oil.

5. A polyunsaturated aliphatic monocarboxylic acid ester of an alcohol present to the extent of at least 15% in the mixture of alcohols obtainable by the carboxylic reduction of the acyl radicals of coconut oil, said monocarboxylic acid being obtainable by the hydrolysis of the drying oil.

6. An ester of a saturated monohydric straight chain primary alcohol of 12 to 14 carbon atoms inclusive with a polyunsaturated aliphatic monocarboxylic acid of the class consisting of linoleic and eleostearic acids.

7. A linoleic acid ester of a saturated monohydric straight chain primary alcohol of 12 to 14 carbon atoms inclusive.

8. An eleostearic acid ester of a saturated monohydric straight chain primary alcohol of 12 to 14 carbon atoms.

9. Dodecyl linoleate.

10. Dodecyl eleostearate.

GEORGE D. GRAVES.
RAYMOND E. THOMAS.

CERTIFICATE OF CORRECTION.

Patent No. 2,109,943.  March 1, 1938.

GEORGE D. GRAVES, ET AL.

It is hereby certified that error appears in the printed specification of the above numbered patent requiring correction as follows: Page 2, second column, line 10, for "oleostearate" read eleostearate; and that the said Letters Patent should be read with this correction therein that the same may conform to the record of the case in the Patent Office.

Signed and sealed this 24th day of May, A. D. 1938.

(Seal)

Henry Van Arsdale,
Acting Commissioner of Patents.